United States Patent [19]

Tsuda

[11] Patent Number: 5,727,027
[45] Date of Patent: Mar. 10, 1998

[54] PSK SIGNAL DEMODULATION METHOD AND APPARATUS

[75] Inventor: Hiroki Tsuda, Tokyo, Japan

[73] Assignee: NEC Corporation, Tokyo, Japan

[21] Appl. No.: 775,707

[22] Filed: Dec. 17, 1996

Related U.S. Application Data

[63] Continuation of Ser. No. 610,592, Mar. 7, 1996, abandoned.

[30] Foreign Application Priority Data

Mar. 7, 1995 [JP] Japan ............................ 7-047057

[51] Int. Cl.$^6$ .............................. H03D 3/22; H04L 27/22
[52] U.S. Cl. ...................... 375/329; 375/325; 375/326
[58] Field of Search ........................ 375/329, 324, 375/323, 326, 344, 371; 329/306; 455/119; 370/104.1

[56] References Cited

U.S. PATENT DOCUMENTS

| | | | |
|---|---|---|---|
| 3,906,376 | 9/1975 | Bass | 329/104 |
| 3,932,705 | 1/1976 | Wulleman | 178/68 |
| 4,100,499 | 7/1978 | Monrolin | 329/50 |
| 4,320,345 | 3/1982 | Waggner | 329/50 |
| 4,457,005 | 6/1984 | Burke et al. | 375/82 |
| 4,833,696 | 5/1989 | Ichiyoshi | 375/121 |
| 4,888,793 | 12/1989 | Chanrod et al. | 375/84 |
| 5,077,531 | 12/1991 | Takeuchi et al. | 329/304 |
| 5,247,543 | 9/1993 | Tsuda et al. | 375/97 |
| 5,268,647 | 12/1993 | Ichiyoshi | 329/308 |
| 5,610,939 | 3/1997 | Takahashi et al. | 375/206 |

Primary Examiner—Stephen Chin
Assistant Examiner—Mohammad Ghayour
Attorney, Agent, or Firm—Ostrolenk, Faber, Gerb & Soffen, LLP

[57] ABSTRACT

In a PSK signal demodulation method of demodulating a received signal by sampling processing, one sampling interval is time-divided. A received signal is detected in different carrier frequency offset ranges in the respective time-division intervals. Reception processing is continuously performed in only a time-division interval in which the received signal is detected after the received signal is detected, thereby synchronizing carrier phase. A PSK signal demodulation apparatus is also disclosed.

10 Claims, 6 Drawing Sheets

PSK SIGNAL DEMODULATION METHOD AND APPARATUS

This is a continuation of application Ser. No. 08/610,592 filed on Mar. 7, 1996 abandoned.

BACKGROUND OF THE INVENTION

The present invention relates to a demodulation method and apparatus and, more particularly, to a demodulation method and apparatus suitable for a satellite communication system for transmitting a PSK (Phase Shift Keying) signal having undergone digital modulation at a low rate.

In a satellite communication system required to perform burst transmission upon PSK modulation in real time, e.g., transmission of voice data, high-speed phase locking of a carrier and a clock is required with respect to a burst signal transmitted from a land earth station or terminal. For this reason, training bits, called a preamble, for carrier and clock reproduction is added to the head of each burst signal to realize high-speed carrier/clock phase lock.

A carrier frequency offset is caused by a Doppler shift, a drift in a local oscillator on the transmission or satellite side, a residue of automatic frequency control (AFC), or the like. This carrier frequency offset interferes with high-speed phase lock. According to a conventional phase lock technique for a carrier frequency offset, phase lock is achieved by the following method.

A first-order phase-locked loop (PLL) is used for initial carrier acquisition. This phase-locked loop is capable of high-speed carrier phase lock with respect to an unmodulated preamble even with a low carrier-to-noise power (C/N) ratio. If there is a carrier frequency offset $\Delta\omega$ ($=2\pi\Delta f$), a nonlinear derivative equation of first order, which represents a response of a phase error $\theta e(t)$ when a phase detector having sine wave characteristics is to be used, is given as follows:

$$\frac{d\theta e(t)}{dt} = \Delta\omega - k\sin\theta e(t) \quad (1)$$

where k is the loop gain. In this case, in order to phase-lock the carrier and set a steady state (almost regarded as $d\theta e(t)/dt = dt \approx 0$), according to equation (1), the following expression must be satisfied:

$$\left|\frac{\Delta\omega}{k}\right| = \left|\frac{2\pi\Delta f}{k}\right| \leq 1 \quad (2)$$

This indicates that phase lock does not occur in a range in which the frequency offset $\Delta f$ exceeds $k/\pi$.

If the loop gain k is increased, the acquisition carrier frequency range can be widened. If, however, the loop gain k is increased, phase jitter in a recovered carrier cannot be suppressed to a low level under an operation condition of a low C/N ratio. That is, limitations are imposed on the carrier frequency range in which initial acquisition can be performed with the first-order PLL.

If, for example, the loop gain of the first-order PLL is set to $k=0.2 \pi fb$ when the modulation rate is low, e.g., when the modulation rate is set to $fb=4,800$ [baud], the frequency range in which phase lock can be achieved by the first-order PLL is given by $$|\Delta f| \leq k/2\pi = 0.2\pi fb/2\pi = 480 \text{ Hz}$$

In a low-speed transmission system in which a carrier frequency offset of 500 Hz or more occurs, it is difficult to perform high-speed carrier acquisition at a preamble portion by using an unmodulated preamble added to the head of a burst signal.

Figure 7:
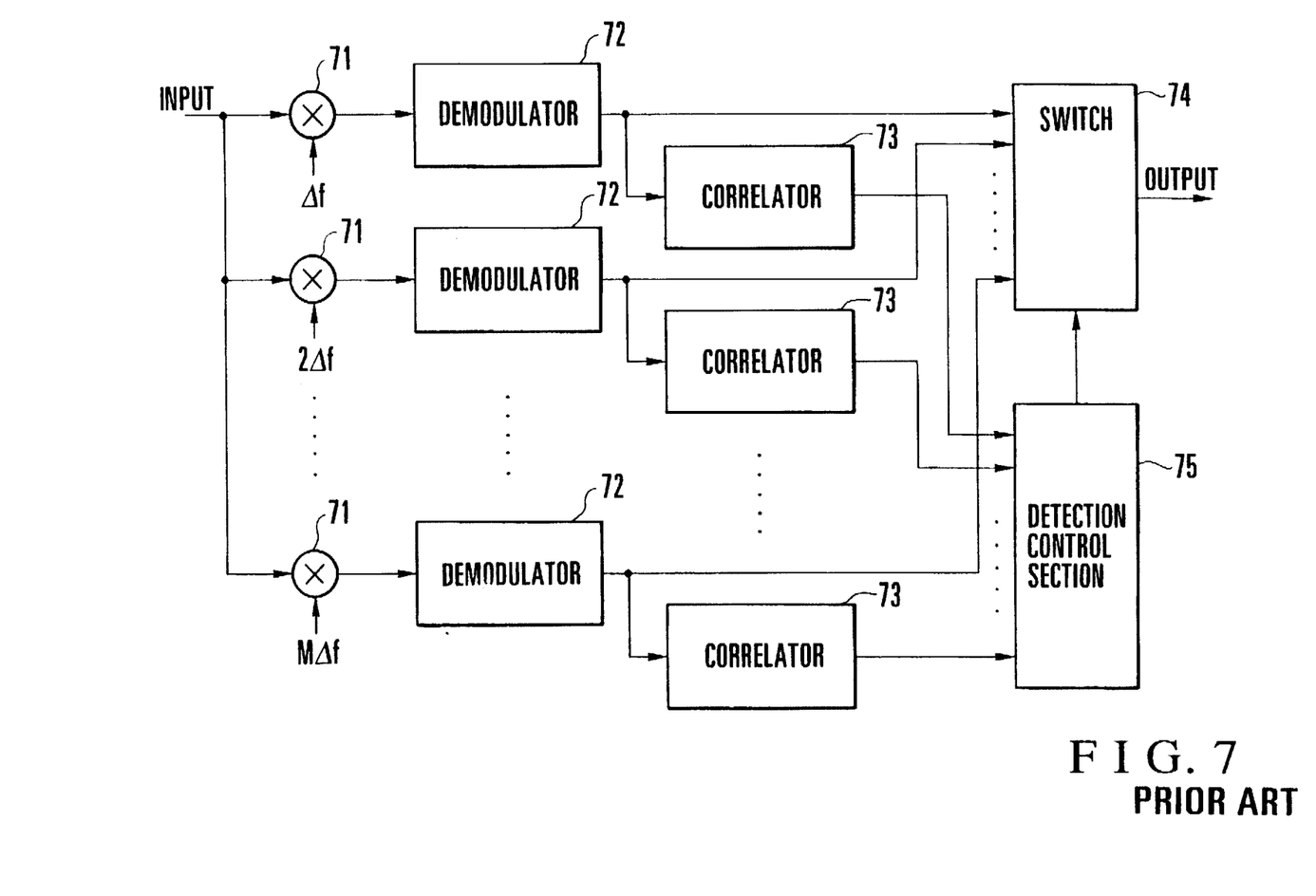
FIG. 7 is a block diagram showing a conventional demodulation apparatus.

As shown in FIG. 7, in order to solve such a problem, a conventional apparatus uses multiple frequency converters 71 and multiple demodulators 72, which can perform high-speed phase lock by using a preamble and acquire a signal in different carrier frequency offset ranges. In this configuration, the optimum reception demodulator and the like are selected in accordance with a correlation value based on a demodulated signal and known data. Reference numerals 73 denote correlators; 74, a switch; and 75, a detection control section.

Such a method, however, requires the multiple frequency converters 71, the multiple demodulators 72 each constituted by a filter, a clock recovery circuit, a carrier recovery circuit, and the like, an optimum demodulation detection means constituted by the correlators 73 and the detection control section 75. For this reason, the receiver is large in size and hence is not economical.

In addition, in a mobile satellite communication environment, fading (shadowing) of received signal power is caused by buildings and other receiving objects on a transmission path. Under such a condition, a preamble may be lost, resulting in failure in carrier/clock phase lock.

SUMMARY OF THE INVENTION

It is an object of the present invention to provide a method and apparatus which can reliably receive and modulate even a received signal with a large carrier frequency offset.

It is another object of the present invention to provide a method and apparatus which can reduce a system configuration and the size of a receiver/demodulation apparatus by performing receiving/demodulation of a PSK signal by time-division processing until a received signal is detected.

It is still another object of the present invention to provide a method and apparatus which can receive and demodulate a PSK signal by real-time processing at a high speed.

It is still another object of the present invention to provide a method and apparatus which can achieve carrier/clock phase lock throughout a wide frequency range in real time at a high speed in satellite communication of low-speed transmission of a PSK signal, and is suitable for a mobile satellite communication environment.

In order to achieve the above objects, according to the present invention, there is provided a PSK signal demodulation method of demodulating a received signal by sampling processing, comprising the steps of time-dividing one sampling interval, detecting a received signal in different carrier frequency offset ranges in the respective time-division intervals, and continuously performing reception processing in only a time-division interval in which the received signal is detected after the received signal is detected, thereby synchronizing carrier phase.

DESCRIPTION OF THE PREFERRED EMBODIMENT

Figure 1:
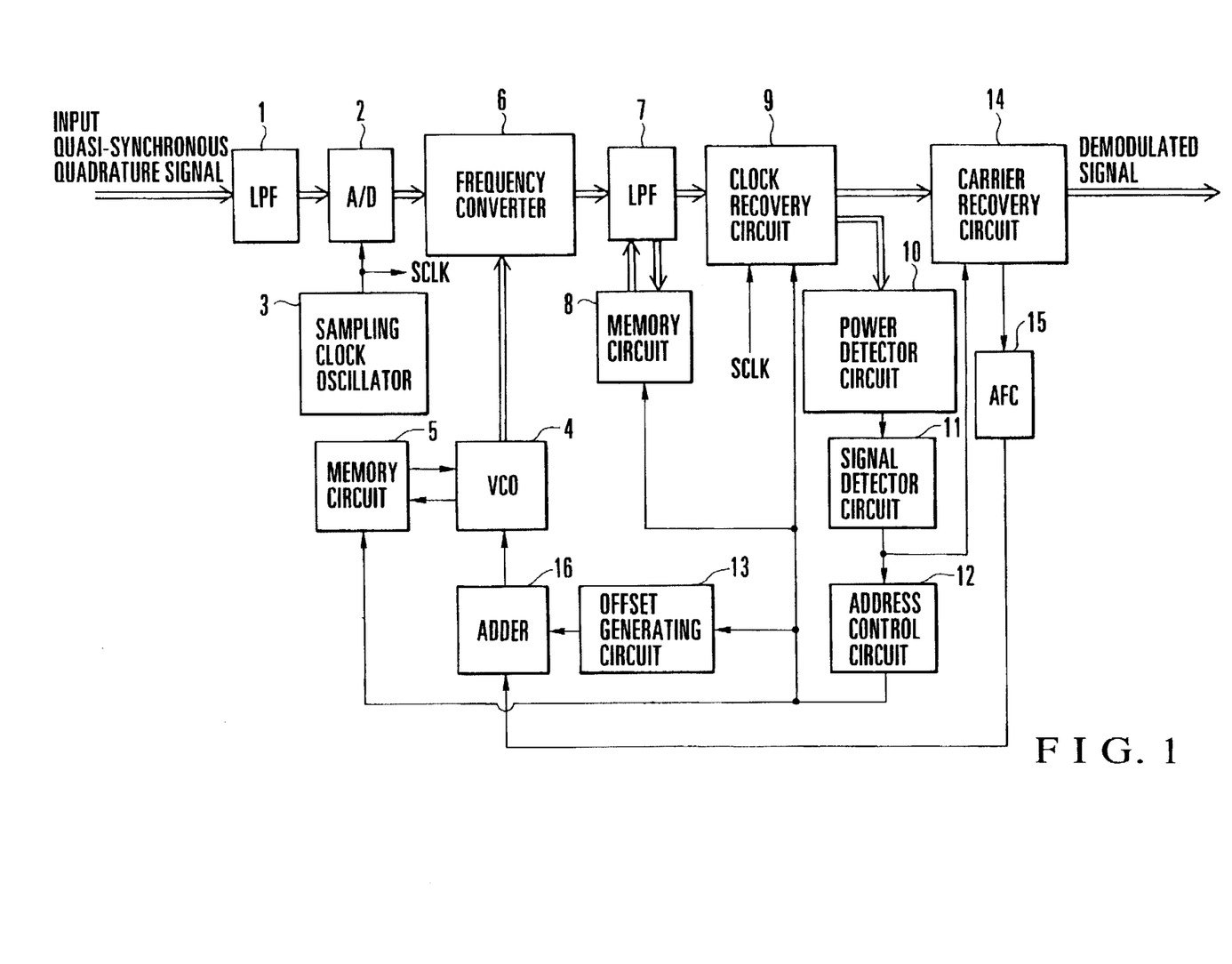
FIG. 1 is a block diagram showing a demodulation apparatus according to an embodiment of the present invention.

An embodiment of the present invention will be described below with reference to the accompanying drawings. FIG. 1 shows the configuration of a demodulation apparatus according to an embodiment of the present invention.

This demodulation circuit is designed to achieve carrier/clock phase lock throughout a wide frequency range in real time at a high speed in satellite communication of low-speed transmission of a PSK modulated signal. The demodulation apparatus comprises a first low-pass filter (LPF) 1 for removing harmonic components from an input quasi-coherent detection, orthogonal signal, an analog-to-digital converter (A/D) 2 for sampling a quasi-coherent detection, orthogonal signal having passed through the low-pass filter 1, a sampling clock oscillator 3 for supplying a sampling clock SCLK to the A/D converter 2, a voltage-controlled oscillator (VCO) 4 whose oscillation frequency is controlled by a control voltage, a first memory 5 storing processing information (integral or cumulative value) of multiple frequency signals output from the VCO 4, a frequency converter 6 for converting a sampling frequency with a signal output from the VCO 4, a second low-pass filter (LPF) 7 for Nyquist-band-limiting a signal frequency-converted by the frequency converter 6, a second memory 8 storing data information required for the filtering operation of the second low-pass filter 7, a clock recovery circuit 9 for clock phase synchronization by estimating a clock error from the correlation between the envelope of a received signal output from the second low-pass filter 7 and the reference clock SCLK, a power detector 10 for calculating a correlation value from an output signal from an integrator for integrating the correlation result in the clock recovery circuit 9, a signal detector 11 for detecting the received signal output from the power detector 10, an address control circuit 12 for controlling address generation in a time-division processing interval for the received signal, an offset generating circuit 13 for generating a frequency offset corresponding to the address generated by the address control circuit 12, a carrier recovery circuit 14 for generating a recovered carrier from an orthogonal signal whose signal point is sampled by the clock recovery circuit 9, an automatic frequency control circuit (AFC) 15 for correcting the carrier frequency error obtained by the carrier recovery circuit 14, and an adder 16 for adding the signals output from the offset generating circuit 13 and the automatic frequency control circuit. 15 to control the oscillation frequency of the VCO 4.

The operation of the present invention will be briefly described first.

The operation of the apparatus of the present invention is divided into a time-division processing operation to be performed until a PSK signal is received and detected and a normal signal processing operation to be performed upon detection of the received signal.

Figure 2:
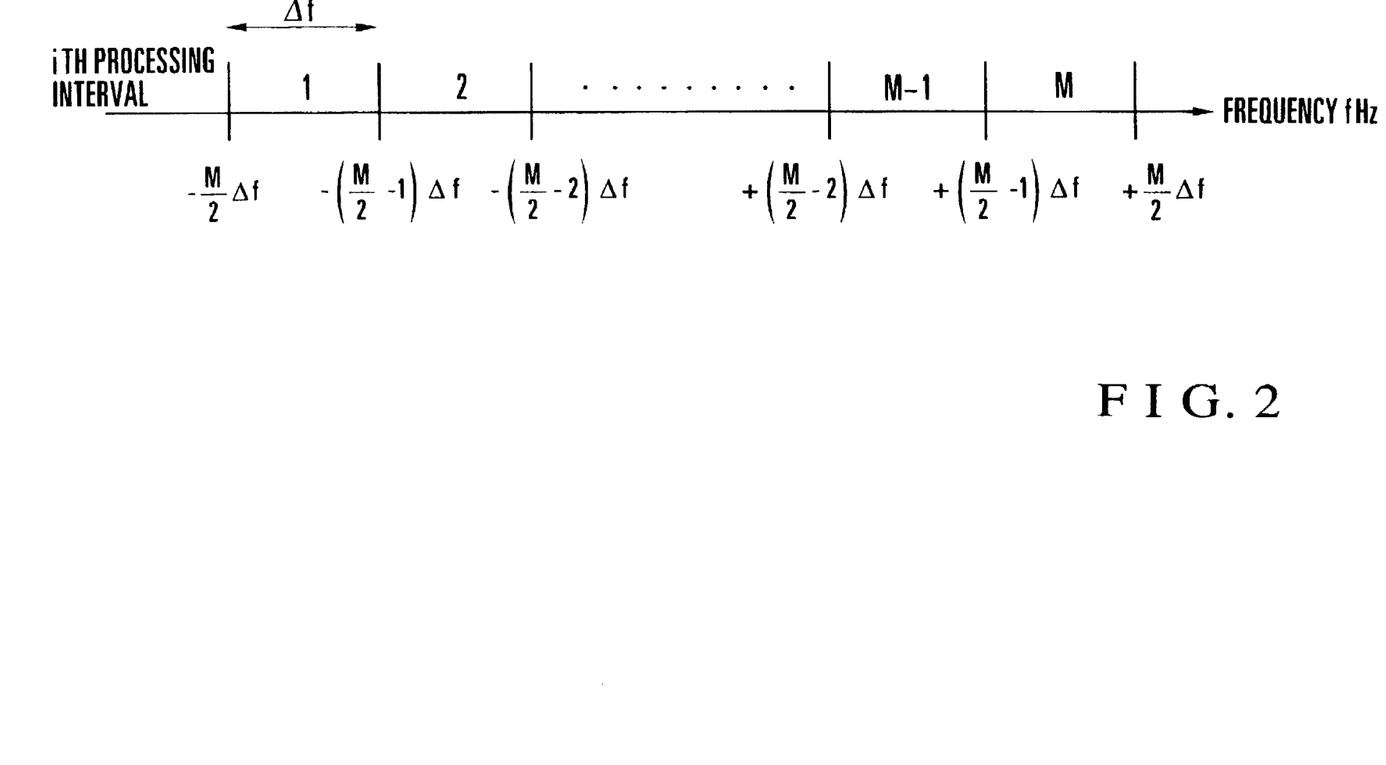
FIG. 2 is a view showing an acquisition carrier offset range.

In the time-division processing operation to be performed until a signal is detected, one sampling interval is time-divided, and a received signal is detected in different carrier frequency offset ranges within the respective divided times (time-division time slots or channels). With this operation, received signals to be acquired throughout the carrier frequency ranges by time-division processing in one sampling interval are detected. FIG. 2 shows an offset range in which carriers can be acquired by the present invention. One sampling interval is divided into M intervals, and the M divided intervals are assigned to reception processing in the each carrier frequency range with different Δf Hz, thereby allowing acquisition of carriers in the carrier frequency offset range of −(M/2)Δf Hz to +(M/2)Δf Hz.

When a received signal is detected by time-division processing in any one of the divided intervals of one sampling interval, the corresponding divided interval becomes an optimum time-division processing interval in which the carrier frequency offset of an input to the carrier recovery circuit 14 is minimized. After the received signal is detected, the divided interval in which the signal is detected is set as an optimum time-division processing interval. The remaining time-division processing operations are stopped, and the normal signal processing operation is started.

Subsequently, the carrier recovery circuit 14 starts synchronizing carrier phase lock and performs demodulation with respect to the received signal obtained in the optimum time-division processing interval (time-division time slot or channel).

After the reception PSK signal undergoes quasi-coherent detection, the first low-pass filter 1 is used to remove harmonic components from the received signal, and the A/D converter 2 samples the signal by using the sampling clock SCLK. The signal is then frequency-converted with a signal output from the VCO 4. The frequency-converted signal is then Nyquist-band-limited by the second low-pass filter 7.

Figure 3:
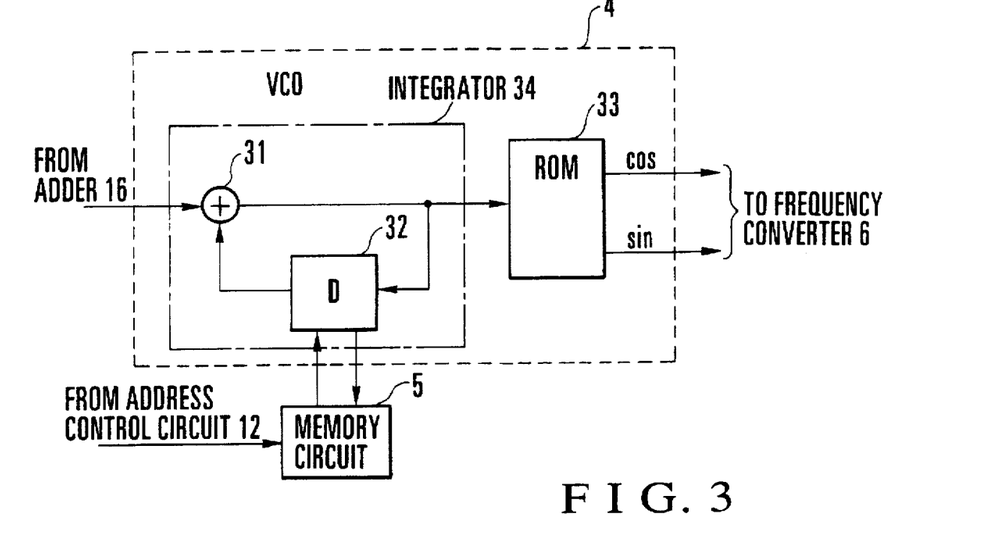
FIG. 3 is a block diagram showing an arrangement of a VCO and a first memory in FIG. 1.

As shown in FIG. 3, the VCO 4 can be constituted by an integrator 34 including an adder 31 and a delay circuit 32, and a ROM 33 storing information of sine and cosine functions and used to convert an output from the integrator 34 into sine and cosine values. Until the signal is detected, i.e., during time-division processing, the VCO 4 loads a numerical value stored at an address designated by the address control circuit 12 at the start of the time-division interval from the memory 5 into the delay circuit 32. The loaded value is integrated with the input signal by the adder 31. The integral value is then stored in the memory 5 and output to the ROM 33. After one sampling operation, the integral value stored in the memory 5 is loaded into the delay circuit 32 again in a time-division interval corresponding to an address designated by the address control circuit 12. An orthogonal signal for frequency conversion of the sampled signal is output from the ROM 33. In this manner, the VCO 4 independently operates in each time-division interval for each sampling operation corresponding to each address designated by the address control circuit 12 until the received signal is detected.

When the received signal is detected, the address control circuit 12 sets (fixes) the address corresponding to the processing interval in which the received signal is detected, and loads an integral value stored at the address from the memory 5. After this loading operation, processing using the integral value is continuously performed as processing for each sampling operation without performing time-division processing.

Figure 4:
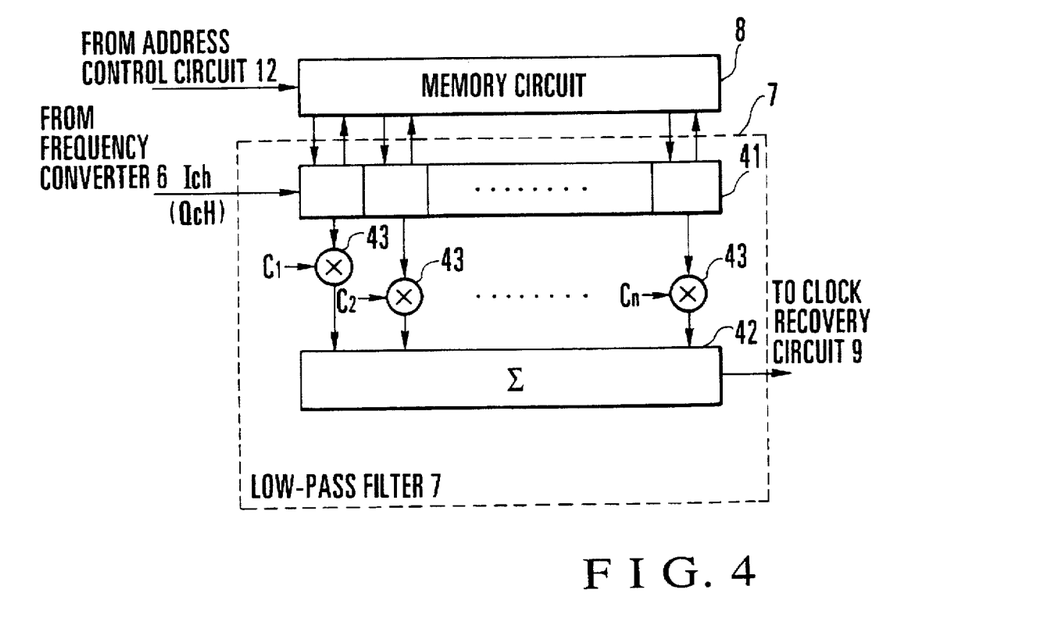
FIG. 4 is a block diagram showing an arrangement of a second low-pass filter and a second memory.

The second low-pass filter 7 for performing a Nyquist band limiting operation is constituted by a shift register 41, filter coefficients $C_1, C_2, \ldots, C_n$, multipliers 43, and an adder 42, as shown in FIG. 4. Although the configuration in FIG. 4 corresponds to one component (in-phase or orthogonal component) of an orthogonal signal, a similar configuration can be applied to the other component.

The operation of the low-pass filter 7 in FIG. 4 is also executed by time-division processing until a received signal is detected. Data (n sample values) stored at an address designated by the address control circuit 12 at the start of a time-division interval is loaded from the memory 8 into the shift register 41. The loaded data is shifted by one bit (corresponding to one sampled value). At the same time, new data (one sampled value) is received. The updated data in the shift register 41 is stored in the memory 8, and the convolutional integration of the respective data and the filter coefficients is calculated by the multipliers 43 and the adder 42. After one sampling operation, data stored in the memory 8 in a time-division interval corresponding to an address designated by the address control circuit 12 is loaded into the shift register 41. That is, filtering processing is executed independently (time-divisionally) in each time-division interval for each sampling operation corresponding to each address designated by the address control circuit 12 until the received signal is detected.

When the received signal is detected, the address corresponding to the optimum processing interval in which the received signal is detected is set (fixed), and data stored at the address is loaded from the memory 8 into the shift register 41. After the loading operation, filtering processing using the data is continuously performed as processing for each sampling operation without performing time-division processing.

The band-limited signal is input to the clock recovery circuit 9, and clock phase is synchronized on the basis of the phase correlation between the envelope of the received modulated signal and the reference clock signal.

Figure 5:
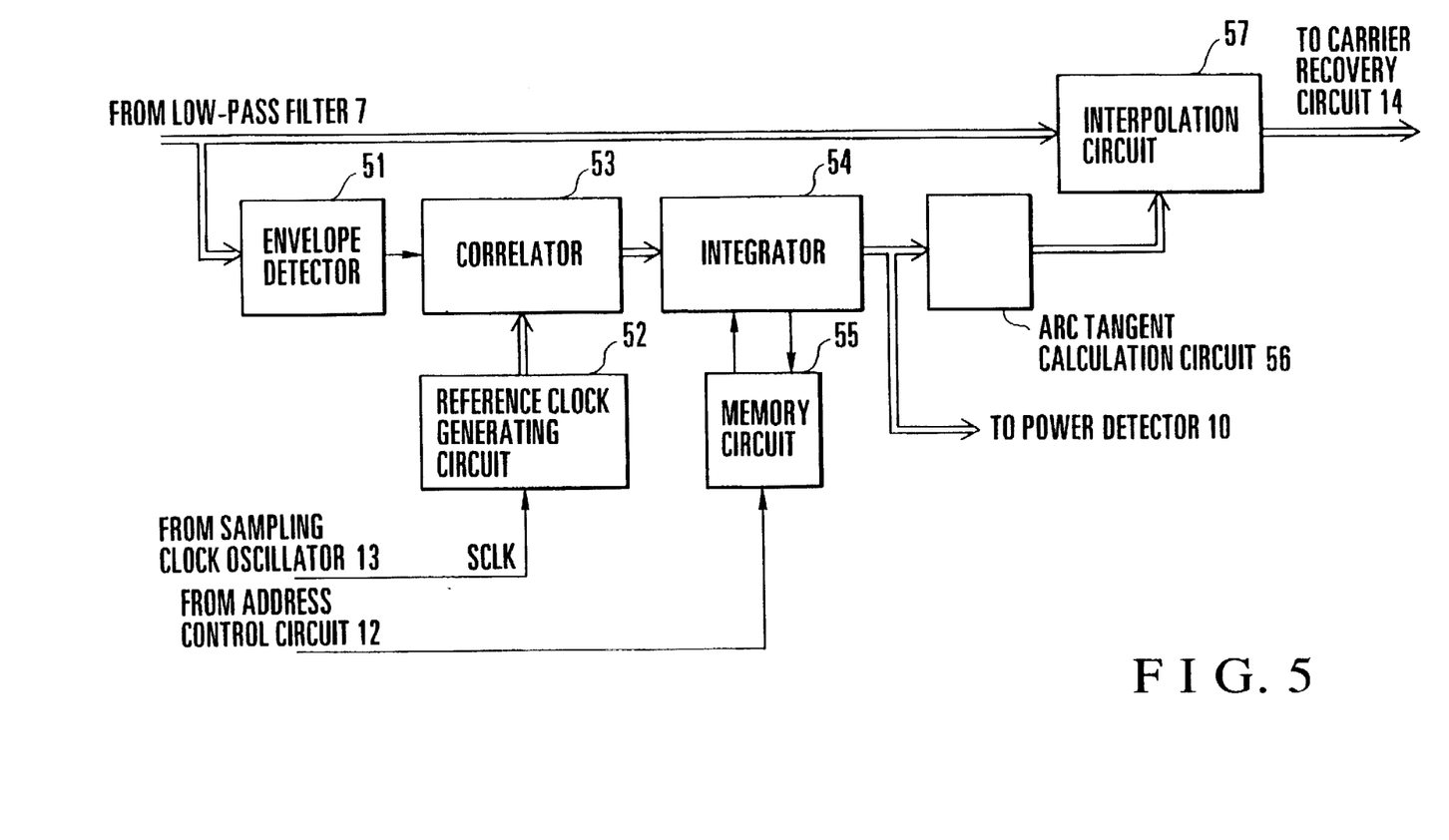
FIG. 5 is a block diagram showing an arrangement of a clock recovery circuit in FIG. 1.

As shown in FIG. 5, the clock recovery circuit 9 comprises an envelope detector 51 for detecting the envelope of an orthogonal signal band-limited by the second low-pass filter 7, a reference clock generating circuit 52 for generating a reference complex sine wave on the basis of the sampling clock SCLK output from the sampling clock oscillator 3, a correlator 53 for calculating the correlation between an envelope and a reference signal sine wave, an integrator 54 for averaging outputs from the correlator 53, a third memory circuit 55 storing information required for the integrator 54, an arc tangent calculation circuit 56 for calculating an arc tangent, and an interpolation circuit 57.

In the clock recovery circuit 9, the envelope detector 51 calculates the envelope of a signal, with N sampling operations per modulation period, from a signal band-limited by the second low-pass filter 7. Letting Ts be the sampling period and I(nTs) and Q(nTs) be the in-phase and orthogonal components of an orthogonal signal, respectively, an envelope signal Ve(nTs) is calculated by $$Ve(nTs) = \sqrt{I(nTs)^2 + Q(nTs)^2} \quad (3)$$

(n: integer)

The correlator 53 calculates the phase correlation between the envelope calculated by equation (3) and the reference complex sine wave of a frequency 1/NTs almost corresponding to a modulation clock generated by the reference clock generating circuit 52 on the basis of the sampling clock. This phase correlation value is integrated by the integrator 54.

Figure 6:
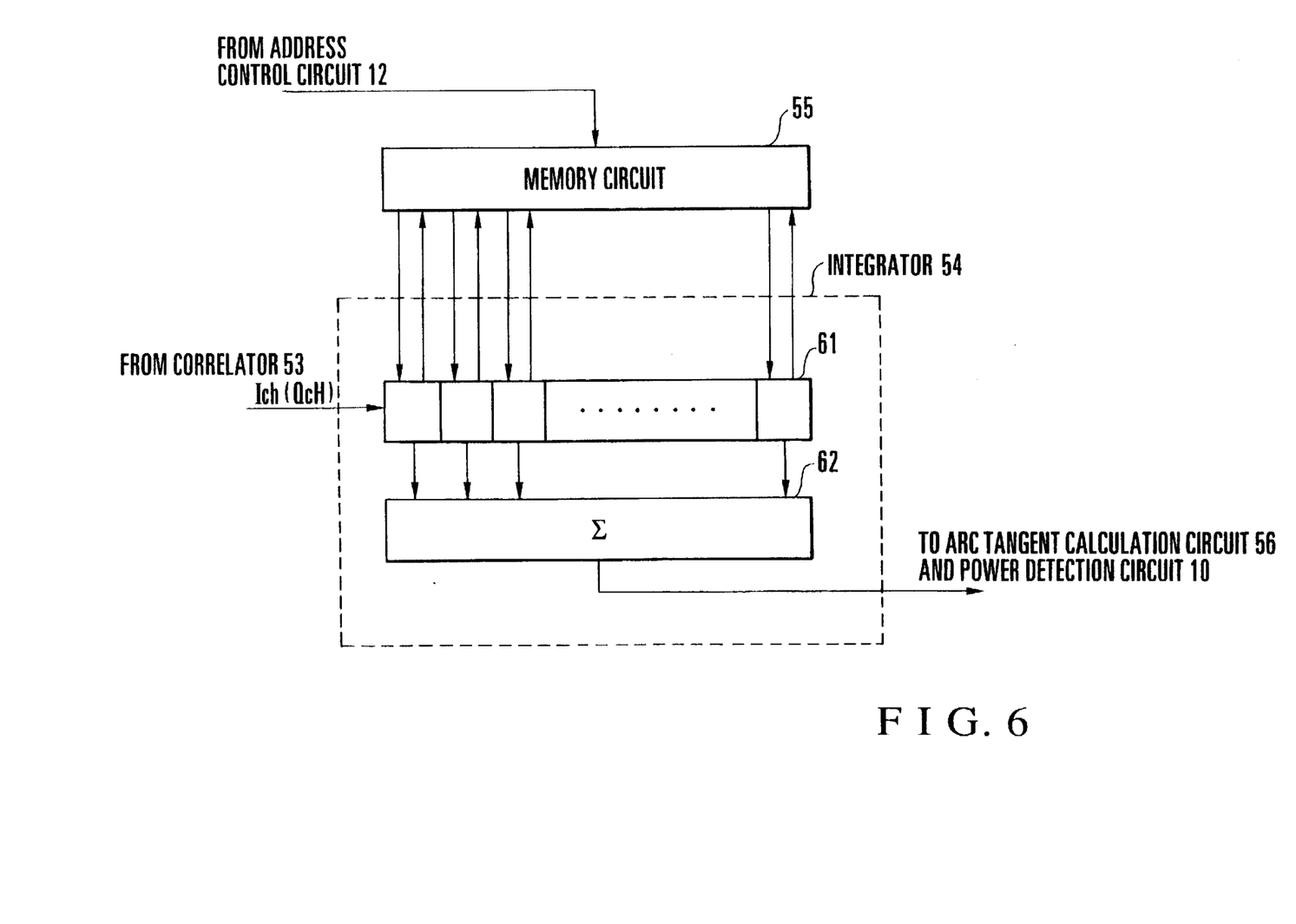
FIG. 6 is a block diagram showing an arrangement of an integrator and a third memory in FIG. 5.

FIG. 6 shows an example of the arrangement of the integrator 54 together with the third memory. The integrator 54 is constituted by a shift register 61 and an adder 62. Although the arrangement in FIG. 6 corresponds to one component (in-phase or orthogonal component) of an orthogonal signal, a similar arrangement can be applied to the other component.

In time-division processing to be performed until a received signal is detected, data stored at an address designated by the address control circuit 12 at the start of a time-division interval is loaded from the third memory circuit 55 into the shift register 61. The loaded data is shifted by one bit. At the same time, new data is received. The updated data in the shift register 61 is stored in the third memory circuit 55, and the respective data in the shift register 61 are added together. After one sampling operation, data stored in the third memory circuit 55 again in each time-division interval for each sampling operation corresponding to each address designated by the address control circuit 12 is loaded into the shift register 61. Until the received signal is detected, integration is executed independently in each time-division interval for each sampling operation corresponding to each address designated by the address control circuit 12.

When the received signal is detected, the address corresponding to the optimum processing interval in which the received signal is detected is set (fixed). The time-division operation is then stopped, and the data stored at the corresponding address is loaded into the shift register 61. After the loading operation, integration is performed by using the data for each sampling operation.

An arc tangent is calculated from the output from the integrator 54, and the phase difference between the received modulated signal and the reference complex sine wave is estimated. This phase error θ(nTs) is given by $$\theta(nTs) = arg\left[\sum_{n-(NL-1)/2}^{n+(NL-1)/2} Ve(kTs)\exp(-j2\pi k/N)\right] \quad (4)$$

where L is the number of integration symbols, and arg(x) is an arc tangent operation.

The phase error θ(nTs) of a clock represents the error between the true clock timing and a sampling timing. A sampled signal value (a signal sampled at the true clock timing) can be obtained by interpolation using a sampling point nearest to the true clock timing and sampling points on the two sides of the nearest sampling point.

Letting S(0) be the sampling point nearest to the true clock timing, S(−Ts) and S(Ts) be the sampling points on the two sides of the nearest sampling point, and t=Nθ(nTs) be the standard interpolation timing, an interpolation timing Si(t) can be given by using a second-order Lagrange interpolation method as follows:

$$Si(t) = \frac{t(t-1)}{2}S(-Ts) - (t+1)(t-1)S(0) + \frac{t(t+1)}{2}S(Ts) \quad (5)$$

$$= C_{-1}(t)S(-Ts) + C_0(t)S(0) + C_{+1}(t)S(+Ts)$$

$$= \sum_{n=-1}^{1} Cn(t)S(nTs)$$

In this case, $C_{-1}=t(t-1)/2$, $C_0=-(t+1)(t-1)$, and $C_{+1}=t(t+1)/2$. This coefficient Cn is a function of the standard interpolation timing t, and hence is prepared in a table. By calculating the product sum of the coefficients and the sampled data, a sampled signal value is obtained.

The magnitude of the result obtained by integrating the phase correlation is calculated by the power detector according to the following equation:

$$Cb(nTs) = abs\left[\sum_{k=n-(NL-1)/2}^{n+(NL-1)/2} Ve(kTs)\exp\{-j(2\pi k/N)\}\right] \quad (6)$$

where abs() represents an absolute value operation.

By comparing the magnitude of this correlation value with a predetermined threshold, it is checked whether the signal detector 11 has received a signal. This determination result is input to the address control circuit 12 and the carrier recovery circuit 14 to start carrier phase lock.

The address control circuit 12 controls an address signal in time-division processing of each sampling operation until the received signal is detected, and supplies the address signal to the first memory 5, the second memory 8, the third memory circuit 55, and the offset generating circuit 13. The address signal corresponds to a frequency control signal output from the offset generating circuit 13 in a time-division interval for each sampling operation, and the respective time-division intervals represent received signal detection processing in different carrier frequency offset ranges.

When the received signal is detected by the signal detector 11, the address control circuit 12 sets the time-division interval in which the received signal is detected as an optimum processing interval in which the carrier frequency offset at the input of the carrier recovery circuit is minimized, and sets the address corresponding to the processing interval in the first memory 5, the second memory 8, the third memory circuit 55, and the offset generating circuit 13. After the detection signal is detected, time-division processing for each sampling operation is stopped, and phase lock processing in only the optimum time-division processing interval is executed.

The offset generating circuit 13 outputs a frequency control signal corresponding to the address signal controlled by the address control circuit 12, and controls the VCO 4 through the adder 16.

The sampled signal value obtained by the clock recovery circuit 9 is input to the carrier recovery circuit 14. The carrier recovery circuit 14 starts carrier recovery by using a received signal detection signal from the signal detector 11, and demodulates the received signal by coherent detection. A carrier frequency error is extracted to follow variations in the carrier frequency of the received signal, and the VCO 4 is controlled by the AFC 15.

The method and apparatus of the present invention can realize phase lock at a higher speed by adding a preamble, in which the line spectrum of a clock is emphasized, to the head of a burst signal. The present invention can also be applied to even a modulated signal from which a preamble is lost by shadowing that may occur in a mobile satellite communication environment.

As has been described above, in the demodulation method and apparatus of the present invention, until a received signal is detected, one sampling interval is time-divided, and a received signal is detected in different carrier frequency offset ranges in the respective divided intervals on the basis of the correlation between an envelope of the received modulated signal and a reference clock, thereby achieving clock/carrier phase lock. With this operation, a reduction in the size of the apparatus can be attained. In addition, in satellite communication of low-speed transmission of a PSK signal, carrier/clock phase lock can be achieved throughout a wide frequency range in real time at a high speed, and hence the present invention can be suited for a mobile satellite communication environment.

What is claimed is:

1. A PSK signal demodulation method of demodulating a received signal by sample processing, comprising the steps of:

time-dividing one sampling interval;

detecting a received signal in different carrier frequency offset ranges in the respective time-division intervals; and continuously performing reception processing in only a time-division interval in which the received signal is detected after the received signal is detected, thereby synchronizing carrier phase on the basis of clock synchronizing of the sampling interval.

2. A PSK signal demodulation method of demodulating a received signal by sampling processing, comprising the steps of:

time-dividing one sampling interval;

generating different frequency signals in the respective time-division intervals to frequency-convert the received signal;

detecting the received signal on the basis of a correlation between an envelope of a PSK signal after the frequency conversion and a reference clock synchronized with the sampling operation; and continuously performing reception processing in only a time-division interval in which the received signal is detected after the received signal is detected, thereby synchronizing carrier phase.

3. A PSK signal demodulation method of demodulating a received signal by sampling processing, comprising the steps of:

time-dividing one sampling interval;

generating different frequency signals in the respective time-division intervals to frequency-convert the received signal;

detecting the received signal on the basis of a correlation between an envelope of a PSK signal after the frequency conversion and a reference clock synchronized with the sampling operation;

continuously performing reception processing in only a time-division interval in which the received signal is detected after the received signal is detected;

detecting a clock phase error on the basis of the correlation to output an optimum sampling signal by interpolation; and synchronizing carrier phase by using the optimum sampling signal.

4. A PSK signal demodulation apparatus comprising:

an A/D converter for sampling a received signal;

a voltage-controlled oscillator for generating multiple different frequency signals;

an offset generating circuit for generating a frequency control signal in accordance with an address signal to output the frequency control signal to said voltage-controlled oscillator;

a frequency converter for receiving outputs from the A/D converter and the voltage-controlled oscillator;

a received signal detector for detecting a received signal on the basis of the interrelationship between an envelope of the PSK signal after frequency conversion and standard clock synchronizing of the sampling signal, and an address control circuit for receiving the output from the received signal detector, supplying address signals to the offset generating circuit in accordance with reception in different carrier frequency offset ranges, and when detecting the received signal, continuously outputting a corresponding address signal after detection of the received signal.

5. An apparatus according to claim 4, further comprising a first memory unit for temporarily storing processing information of multiple different frequency signals generated by said voltage-controlled oscillator, said first memory unit performing read and write operations with respect to processing information for the frequency signals for said voltage-controlled oscillator in accordance with the address signals output from said address control circuit.

6. A PSK signal for demodulation apparatus comprising:

an A/D converter for sampling a received signal;

a voltage-controlled oscillator for generating multiple different frequency signals;

an offset generating circuit for generating a frequency control signal in accordance with an address signal to output the frequency control signal to said voltage-controlled oscillator;

a frequency converter for receiving outputs from said A/D converter and said voltage-controlled oscillator;

a received signal detector for detecting a received signal on the basis of the output from said frequency converter;

an address control circuit for receiving the output from said received signal detector, supplying address signals to said offset generating circuit in accordance with reception in different carrier frequency offset ranges, and when detecting the received signal, continuously outputting a corresponding address signal after detection of the received signal; and a filter for Nyquist-band-limiting an output signal from said frequency converter, an envelope detector for detecting an envelope of an output from said filter, a reference clock generating circuit for generating a reference clock synchronized with the sampling operation, a correlator for calculating a correlation between the envelope and the reference clock, and an integrator for integrating an output from said correlator.

7. An apparatus according to claim 6, further comprising second and third memory units for temporarily storing processing information from said filter and said integrator, said second and third memory unit performing read and write operations with respect to the processing information for said filter and said integrator in accordance with the address signals output from said address control circuit.

8. An apparatus according to claim 6, further comprising an interpolation circuit for receiving an output from said filter and calculating an optimum sampling signal from a clock phase error based on an output from said correlator.

9. An apparatus according to claim 8, further comprising a carrier recovery circuit for receiving an output from said interpolation circuit, said carrier recovery circuit being started, when said received signal detector detects a received signal, to output an automatic frequency control signal from said voltage-controlled oscillator.

10. A PSK signal demodulation method of claim 1, wherein time-division between sampling intervals is performed up to signal detection.

\* \* \* \* \*